(12) United States Patent
Masleid et al.

(10) Patent No.: US 8,583,850 B2
(45) Date of Patent: Nov. 12, 2013

(54) MICRO CROSSBAR SWITCH AND ON-DIE DATA NETWORK USING THE SAME

(75) Inventors: Robert P. Masleid, Monte Sereno, CA (US); Thirumalai Suresh, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 265 days.

(21) Appl. No.: 13/026,582

(22) Filed: Feb. 14, 2011

(65) Prior Publication Data

US 2012/0210040 A1 Aug. 16, 2012

(51) Int. Cl.
G06F 13/00 (2006.01)
G06F 13/40 (2006.01)

(52) U.S. Cl.
CPC .................... *G06F 13/4022* (2013.01)
USPC ........................................................ 710/317

(58) Field of Classification Search
USPC ......................... 710/8–19, 104–110, 305–306, 710/315–317; 716/118–135; 326/39–41
See application file for complete search history.

(56) References Cited

U.S. PATENT DOCUMENTS

| | | | | |
|---|---|---|---|---|
| 5,991,296 | A * | 11/1999 | Mu et al. ........................ | 370/380 |
| 6,771,162 | B1 * | 8/2004 | Moss .......................... | 340/14.62 |
| 6,973,517 | B1 * | 12/2005 | Golden et al. ................ | 710/104 |
| 7,064,412 | B2 | 6/2006 | Geissinger | |
| 7,146,441 | B1 * | 12/2006 | Plants ........................... | 710/100 |
| 7,239,669 | B2 * | 7/2007 | Cummings et al. ............ | 375/295 |
| 7,519,066 | B1 | 4/2009 | Park | |
| 7,603,509 | B1 * | 10/2009 | Wik ............................... | 710/317 |
| 7,647,445 | B2 * | 1/2010 | Drescher et al. .............. | 710/306 |
| 7,778,061 | B2 | 8/2010 | Robinett | |
| 7,873,785 | B2 * | 1/2011 | Olukotun ....................... | 711/118 |
| 7,917,729 | B2 * | 3/2011 | Georgiou et al. ............... | 712/32 |
| 8,270,316 | B1 * | 9/2012 | Chang et al. ................... | 370/254 |
| 8,341,585 | B2 * | 12/2012 | Masleid ......................... | 716/122 |
| 2010/0211719 | A1 * | 8/2010 | Satpathy et al. .............. | 710/317 |
| 2011/0060860 | A1 * | 3/2011 | Rimborg ....................... | 710/317 |
| 2012/0047310 | A1 * | 2/2012 | Satpathy et al. .............. | 710/317 |
| 2012/0120959 | A1 * | 5/2012 | Krause .......................... | 370/392 |

* cited by examiner

*Primary Examiner* — Raymond Phan
(74) *Attorney, Agent, or Firm* — Meyertons, Hood, Kivlin, Kowert & Goetzel, P.C.; Erik A. Heter (57) ABSTRACT

An integrated circuit (IC) having an on-die data network is disclosed. The IC includes a first bus and second buses configured to convey signals in first and second directions, respectively, along a first axis. The second direction is opposite the first. The IC further includes third and fourth buses configured to convey signals in third and fourth directions, respectively, along a second axis perpendicular to the first axis. The fourth direction is opposite the third. Each bus is N-bits wide and unidirectional. Signal lines of two different buses having equal bit significance and opposite direction are arranged adjacent to one another. A crossbar unit having N crossbar switching circuits is configured to couple signal lines of a selected one of the buses to a corresponding signal line of another selected one of the buses. The signal lines of the buses are implemented on different metal layers than the crossbar switching circuits.

20 Claims, 6 Drawing Sheets

MICRO CROSSBAR SWITCH AND ON-DIE DATA NETWORK USING THE SAME

BACKGROUND

1. Field of the Invention

This invention relates to integrated circuits, and more particularly, to interconnection mechanisms implemented on integrated circuits.

2. Description of the Related Art

The effort to increase the amount of computing power on a single integrated circuit (IC) die has, in recent years, led to the design and manufacture of multi-core processors. A multi-core processor effectively implements two or more processors on a single IC die by providing two or more respective processing cores. Each of the cores may include dedicated cache memories and other circuitry. However, some cache memories may be shared among the cores. Similarly, input/output (I/O) interfaces and other circuitry may also be shared among the cores. System level random access memory (RAM) may also be shared by the cores of a multi-core processor.

For various reasons (e.g., maintaining cache coherency, performing parallel computing tasks, etc.), there may be a need at times for communications between the various agents (e.g., cores, cache memories, I/O interfaces) of a multi-core processor. In order to support such communications, an on-chip network or a crossbar may be provided.

An on-die network may be used to connect every agent on the IC die to every other agent. Such an approach may provide efficient communications between a given pair of agents. However, on-die networks may require a significant amount of die area, which can limit the number of agents that may be implemented. Furthermore, communications latencies may vary between one set of agents and another, thus impacting performance. Collisions are another factor that may mitigate the performance of an on-die network.

A crossbar may provide a known, consistent latency for communications between any two sets of agents. Crossbars may connect a group of signal lines forming a bus to another group of signal lines forming another bus. A typical crossbar may include inputs from a number of different buses and outputs to a number of different buses. Crossbars may be capable of connecting any one bus to any other bus or to selected ones of the other buses. However, crossbars may be subject severe wire congestion due to a number of different buses being multiplexed in close vicinity to each other. Furthermore, the number of interconnections in close proximity can, at times, give rise to noise issues.

Thus, in implementing an IC (such as a multi-core processor) requiring communications among a number of different agents, the factors discussed above may be considered. For example, if variable latency is not an issue, an on-die network may be implemented. If latency is an issue but sufficient area is available such that wire congestion is minimized, a crossbar may be considered.

SUMMARY OF THE DISCLOSURE

An integrated circuit (IC) having an on-die data network is disclosed. In one embodiment, the IC includes a first bus configured to convey signals in a first direction along a first axis and a second bus configured to convey signals in a second direction along the first axis. The second direction is opposite the first. Signal lines of equal bit significance of the first bus and the second bus are arranged adjacent to each other. The IC further includes a third bus configured to convey signals in a third direction along a second axis, wherein the second axis is perpendicular to the first axis, and a fourth bus configured convey signals in a fourth direction along the second axis. The fourth direction is opposite of the third. Signal lines of equal bit significance of the third bus and the fourth bus are arranged adjacent to each other. Each of the buses is a unidirectional bus that is N bits wide. The IC further includes a crossbar unit having N crossbar switching circuits each configured to couple a selected signal line of one of the buses to a corresponding selected signal line of another one of the buses.

In one embodiment, an IC includes a first plurality of buses aligned along a first axis and a second plurality of buses aligned along a second axis perpendicular to the first. Each of the first and second pluralities of buses is configured to convey N bits, and is formed on one or more of a first subset of a plurality of metal layers. The IC further includes a plurality of crossbar units each having N single-bit crossbar circuits configured to couple bits of equal significance of one of the first and second pluralities of buses to another one of the first and second pluralities of buses. Each of the N single-bit crossbar circuits is implemented on one or more of a second subset of the plurality of metal layers. Each metal layer of the first subset has a thickness greater than any metal layer of the second subset.

A method for fabricating an IC is also disclosed. In one embodiment, the method includes forming first and second buses along a first axis of an integrated circuit (IC), wherein said first and second buses are formed as unidirectional buses. Forming the first and second buses includes arranging the first bus to convey signals in a first direction, arranging the second bus to convey signals in a second direction opposite of the first direction, and arranging signal lines of equal bit significance of the first and second buses to be adjacent to one another. The method further includes forming third and fourth buses along a second axis of the IC, the second axis being perpendicular to the first, wherein the third and fourth buses are formed as unidirectional buses. Forming third and fourth buses includes arranging the third bus to convey signals in a third direction, arranging the second bus to convey signals in a fourth direction opposite of the third direction, and arranging signal lines of equal bit significance of the third and fourth buses to be adjacent to one another. The method further includes forming a crossbar unit having a plurality of crossbars switching circuits configured to couple a selected signal line of one of the buses to a corresponding selected signal line of another one of the buses. The first, second, third, and fourth buses are formed in a first subset of a plurality of metal layers of the IC, while the crossbar switching circuits are formed in a second subset of a plurality of metal layers. Each metal layer of the first subset has a thickness greater than any metal layer of the second subset.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

The present disclosure is directed to an on-die data network utilizing a number of unidirectional buses. The network includes a number of crossbar units configured to couple two selected buses to one another, one conveying incoming traffic, one to convey the outgoing traffic, in order to facility data transfer between two different functional units. The functional units may include processor cores, input/output (I/O) units, memory controllers, and any other type of functional unit implemented on the IC. The signal lines of the buses may be sorted in various dimensions to facilitate orderly layout and for electrical reasons. In addition, for electrical reasons, the long portions of the bus signal lines may be primarily implemented on upper metal layers of the IC, while the crossbar circuits may be implemented on lower layers. The sorting of the bus signal lines and the utilization of different metal layers for bus signal lines and the crossbar units will be explained in further detail below.

Figure 1:
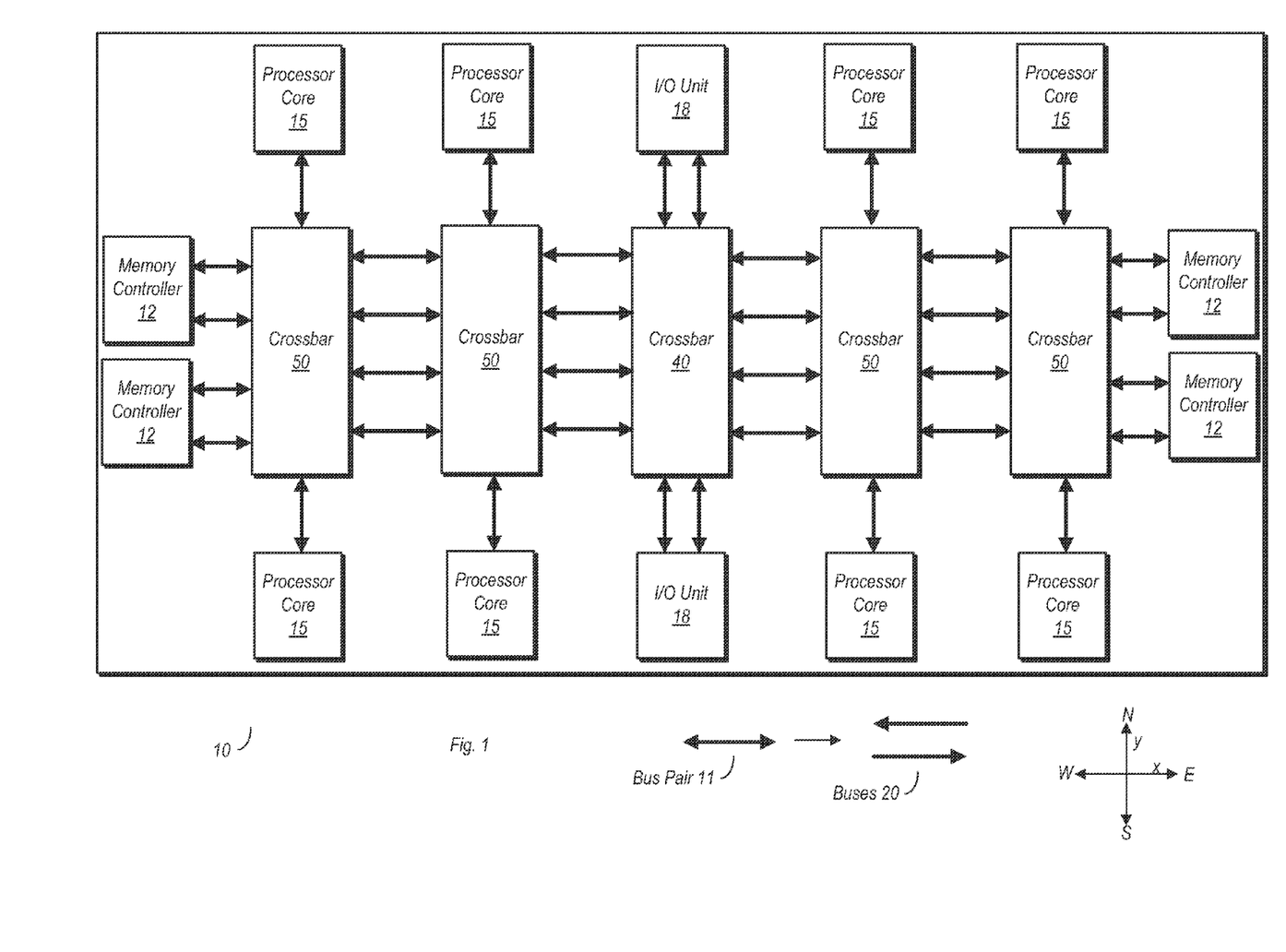
FIG. 1 is a block diagram of one embodiment of an integrated circuit (IC) having an on-die data network.

Integrated Circuit Block Diagram:

Turning now to FIG. 1, a block diagram of one embodiment of an IC having an on-die data network is illustrated. In the embodiment shown, IC 10 includes four memory controllers 12, eight processor cores 15, and two input/output (I/O) units 18. Each of these various agents may be coupled to any one of the others of IC 10 through an on-die data network that includes crossbar unit 40, four instances of crossbar unit 50, and a number of unidirectional buses depicted here as bus pairs 11.

Each bus pair 11, represented here by the bidirectional arrows, includes two physically separate unidirectional buses buses 20. Each bus 20 of a given bus pair 11 is arranged (through coupling of transmitters and receivers) to convey signals in one direction only. Furthermore, counterpart buses 20 of each bus pair 11 are arranged to convey signals in opposite directions.

In the embodiment shown, a given bus 20 of a bus pair 11 may convey signals along one of two different axes, the x-axis or y-axis, which are perpendicular with respect to each other. Furthermore, a given bus 20 of a bus pair 11 in the embodiment shown may convey signals in one of four different directions, north, south, east, or west. Signals traveling east or west are conveyed along the x-axis in this embodiment. Signals traveling north or south are conveyed along the y-axis in this embodiment. It is noted that the terms of the preceding sentence are used here for the sake of simplifying the explanation the physical arrangement of buses 20 in the context of this embodiment of IC 10. Accordingly, the terms 'north,' 'south,' 'east,' and 'west' are only intended to convey information relative to a direction that signals travel on a bus 20 of IC 10, but are not intended to be construed in a geographic context. The same applies to the terms 'westbound', 'eastbound', 'northbound', and 'southbound' as used herein.

Each of the buses 20 may include a total of N signal lines, and may thus be N bits wide. In one exemplary embodiment, each bus may include 128 (N=128) signal lines each. The buses may convey data signals, control signals, address signals, error correction code (ECC) signals, and so forth. In one embodiment, each of buses 20 may be configured to convey M data signals, where M is an integer value that is less than or equal to N. In some cases, the transferring of control, address, ECC, and other non-data signals may be accomplished on buses that are physically separate from data buses. In such embodiments, M may be equal to N, and a separate network may be provided for conveying the non-data signals. In another embodiment, M may be less than N, and each bus 20 may convey both data and non-data signals.

Crossbar unit 40 in the embodiment shown is a 12×12 crossbar unit. That is, crossbar unit 40 in the embodiment shown is coupled to receive inputs from 12 unique instances of buses 20, and is further coupled to provide outputs to 12 unique instances of buses 20. Crossbar units 50 are each 10×10 crossbar units, each coupled to 10 incoming buses and 10 outgoing buses. Each of crossbar units 40 and 50 is configured to couple one of its incoming buses to one of its outgoing buses in order to facilitate communications between a given pair of agents of IC 10. Although not explicitly shown here for the sake of simplicity, each of crossbar units 40 and 50 may be coupled to receive select signals to enable the coupling of a selected incoming bus to a selected outgoing bus.

Since each of the buses 20 is N bits wide in the illustrated embodiment, each of crossbar units 40 and 50 include N crossbar circuits, one for each bit. The crossbar circuits, which will be discussed in further detail below, are each configured to couple signal lines of an incoming and outgoing bus, with the coupled signal lines being arranged to convey bits of equal significance. For example, a given crossbar circuit may couple a bit 0 signal line of an incoming bus to a bit 0 signal line of an outgoing bus.

The signal lines of each of the buses may be physically arranged to efficiently utilize area on the die of IC 10, while also providing for better electrical signal transmission characteristics. A signal line sorting arrangement will now be discussed in conjunction with FIG. 2.

Figure 2:
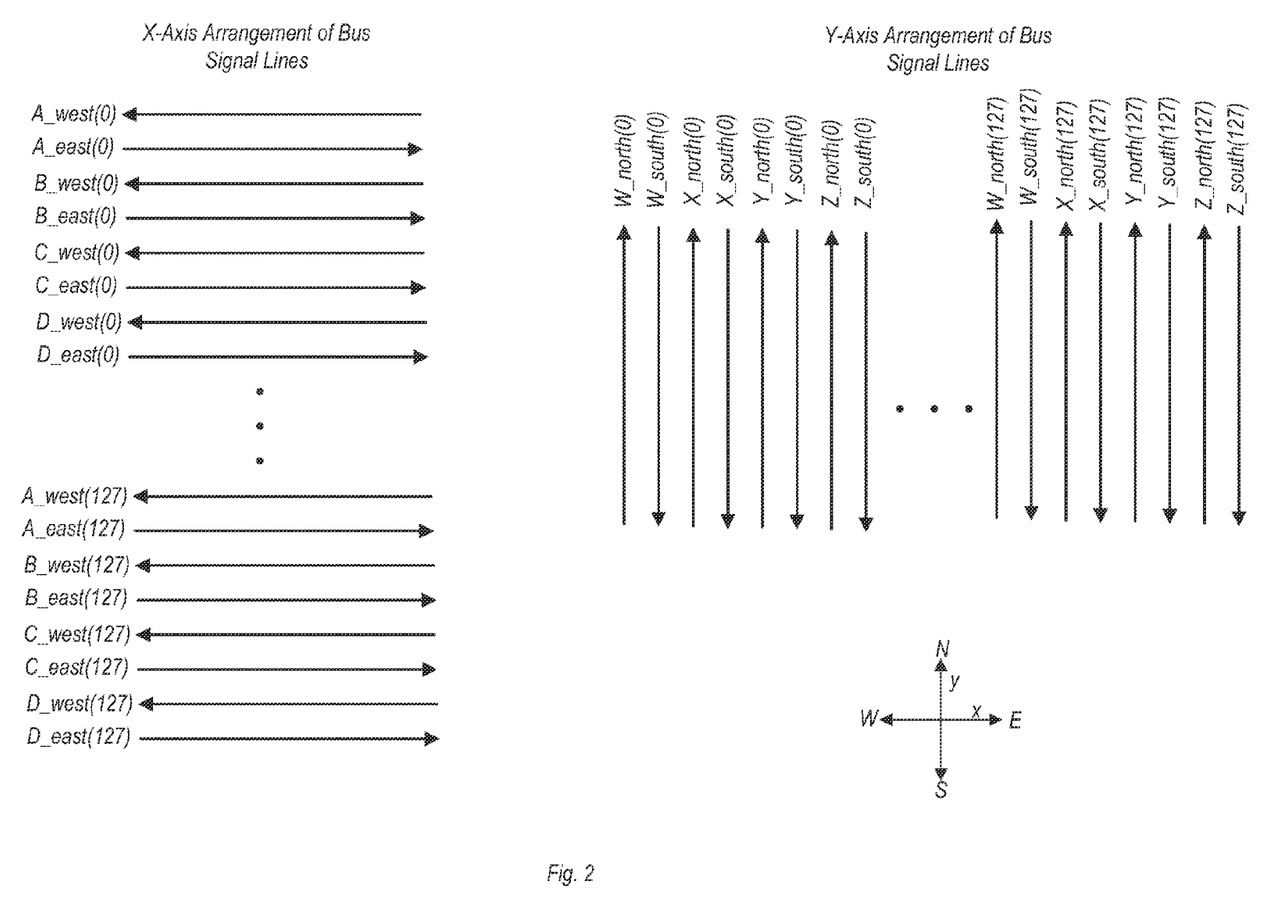
FIG. 2 is a diagram illustrating the sorting of signal lines for multiple buses on one embodiment of an IC.

Bus Signal Line Sorting:

FIG. 2 illustrates the sorting of bus signal lines for an on-die network implemented on one embodiment of IC 10. As shown in FIG. 2, the signal lines of buses may be sorted in various dimensions. These dimensions are as follows: by bus, by bit significance, by direction, with additional sorting occurring along one of the x- or y-axes. For a given axis, this may produce an interleaved arrangement of the buses.

Along the x-axis, the arrangement of signal lines for eight different buses is shown. In the illustrated example, each of the bus lines corresponding to a least significant bit of that bus are arranged to be adjacent to each other. For example, bit 0 of bus A_west is arranged next to bit 0 of A_east, which is arranged in turn adjacent to bit 0 of B_west, and so forth. Similarly, A_west (127) is adjacent to A_east (127), which in turn is adjacent to B_west (127). Accordingly, signal lines of equal bit significance are arranged adjacent to one another. Each bit(0) signal line of a given bus is adjacent to at least one bit(0) signal line of another bus aligned along the same axis, each bit(1) is signal line is adjacent to another bit(1) signal line, and so on.

Another method of sorting in the embodiment shown is to arrange adjacent signal lines such that they are associated with buses traveling in opposite directions. Thus, in the example shown, each signal line of bus A_west (in which signals travel westbound as indicated in the drawing) is adjacent to a signal line of A_east (in which signals travel eastbound as indicated in the drawing). Each signal line of A_east is also adjacent to a signal line of B_west as well, while each signal line of B_east is also adjacent to a signal line of C_west, and so forth. No signal lines of the bus are arranged adjacent to any other signal line upon which signals are conveyed in the same direction in this embodiment.

Arranging signal lines in this manner, such that those of eastbound buses are adjacent to those of westbound buses, may be beneficial for certain electrical reasons. Whenever two signal lines are arranged adjacent to each other, a certain amount of capacitance is present between them. When transmitters coupled to these signal lines transmit signals at approximately the same time, the capacitance between the signal lines may appear larger or smaller, depending on the relative direction of the transmissions (i.e. both in the same directions, such as low to high, or in opposite directions from one another).

When switching in the same direction, the apparent capacitance between the two signal lines may be smaller. In such cases, signals may travel faster than they would otherwise. This can give rise to race conditions where circuits are not allotted a sufficient amount of hold time, which can cause a signal state to be erroneously interpreted.

The apparent capacitance between the two signal lines may be larger when switching occurs in opposite directions. This can cause signals to travel slower than they would otherwise. This in turn can reduce the maximum operating speed of the IC and thus prevent meeting a specified target operating frequency.

The problems described in the previous two paragraphs may be compounded when occurring on two adjacent signal lines in which signals are transmitted in the same direction. However, when signals are transmitted in opposite directions on two adjacent signal lines, these problems may be mitigated. This is due to the fact that the transmissions pass each other only at one point when the signals are traveling between respective transmitters and receivers. Accordingly, the apparent capacitance between adjacent signal lines in the embodiment shown is increased or decreased at only one point when simultaneous transitions occur thereon.

The sorting methodology described above with respect to the x-axis is also performed along the y-axis in the embodiment shown. In this particular example, four buses are arranged to convey signals from north to south (e.g., W_south, X_south, etc.) and fourth buses arranged to convey signals from south to north (e.g., W_north, X_north, etc.). The signals lines of each of these buses is arranged such that each signal line is adjacent to at least one other signal line of equal bit significance, e.g., W_north (0) is adjacent to W_south (0). Pairs of adjacent signal lines are also arranged such that signals travel in opposite directions, e.g., each of the signal lines of W_north are adjacent to a signal line of W_south, while the signal lines of W_south are also adjacent to a signal line of X_north, and so on. No two signal lines in this embodiment are arranged such that signals are conveyed in the same direction on both lines of the pair.

It is noted that the signal lines referenced in FIG. 2 are those that are implemented between two crossbar units. As previously discussed, these signal lines may be implemented along either the x-axis or y-axis, and are thus straight lines. Furthermore, as will now be discussed with reference to FIG. 3, these signal lines may be implemented on upper metal layers of an IC, while the interconnections within the crossbar units themselves are implemented on lower metal layers.

Figure 3:
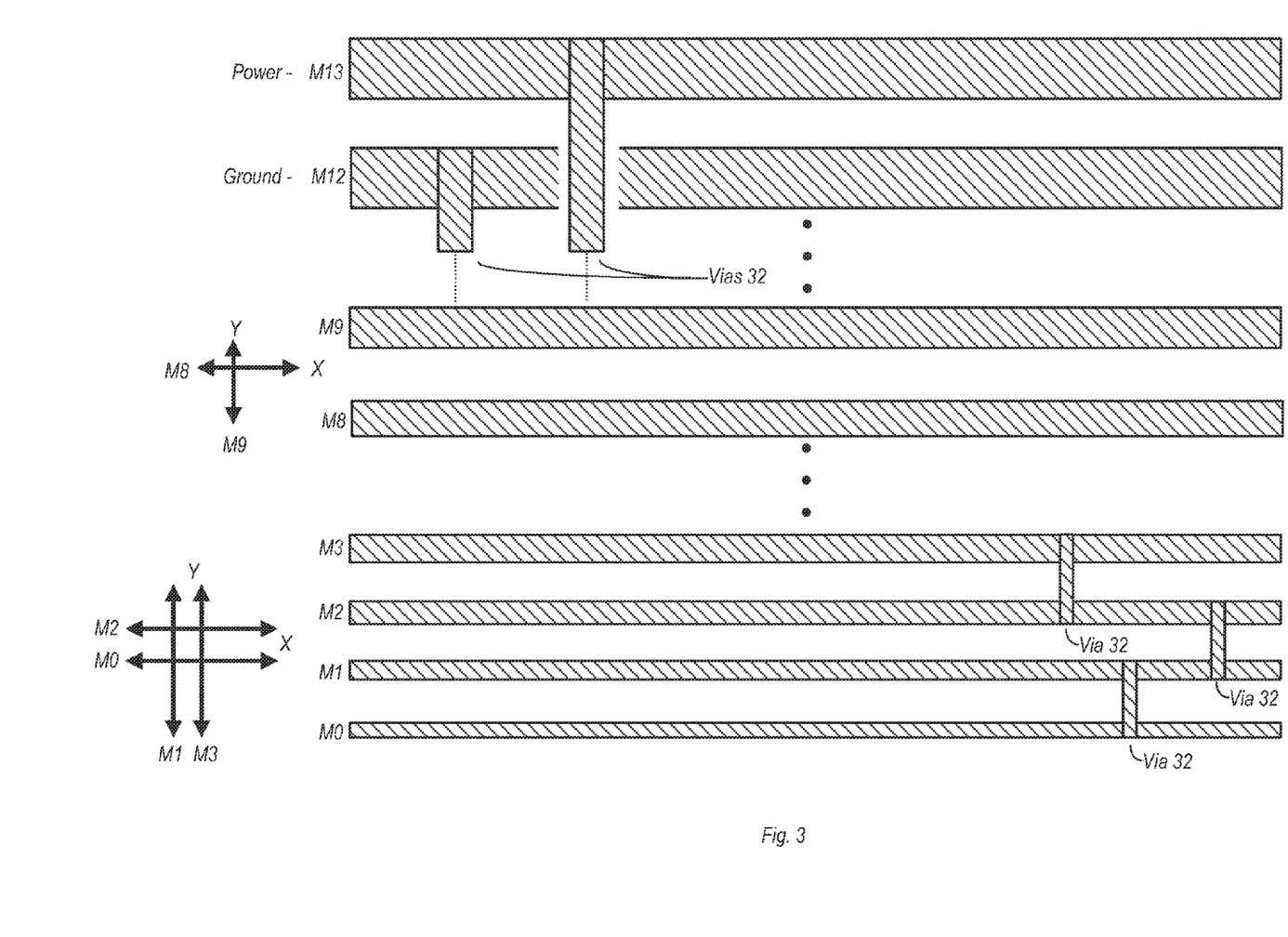
FIG. 3 is a cross-section of one embodiment of an IC illustrating the utilization of various metal layers for implementing bus signal paths and crossbar circuitry.

Integrated Circuit Cross Section:

Turning now to FIG. 3, a cross section illustrating the stack-up of metal layers of one embodiment of an IC is shown. It is noted FIG. 3 is intended to illustrate only certain ones of the metal layers of a representative IC, but does not (for the sake of simplicity) illustrate the other layers that are used as insulators or as a substrate used to implement the actual circuits.

In the embodiment shown, the metal layers are thickest at the top and thinnest at the bottom. The top two layers in this embodiment, M12 and M13, are used to implement ground and power planes, respectively. A pair of corresponding vias 32 is provided in this example to convey connections from power and ground to circuitry below the top layers of the IC.

The bottom four layers, M0-M3 in this example, may be used to implement the interconnections within the crossbar circuits themselves. In this particular embodiment, layers M0 and M2 are used to convey signals along the x-axis, while layers M1 and M3 are used to convey signals along the y-axis (the x- and y-axes as previously defined in the discussion of FIGS. 1 and 2). Exemplary vias 32 are shown providing connections between metal layers M0-M3, and may be used to facilitate 90° turns in a signal path. Although not explicitly shown, additional vias 32 may be provided to couple various connections from the lower metal layers to signal paths on other, upper metal layers.

The signal paths providing interconnections in the crossbar circuits may be thin due to the thinness of the metal layers upon which they are implemented. As will be explained below, this may give rise to slower signal propagation times for signals on these layers. However, since the signal paths are also thin, implementing them on lower metal layers may be more suitable in light of the wiring congestion that is inherent with crossbar circuits.

Metal layers M8 and M9 in this embodiment may be used to implement the long distance bus wires between the crossbar units 40/50. These metal layers may be thicker than the lower metal layers discussed above. Accordingly, the signal lines implemented on these layers may also be thicker than those implemented on the lower metal layers. In this particular embodiment, signal lines extending along the x-axis are implemented on M8, while signal lines extending along the y-axis are implemented on M9.

The lower, thinner metal layers of the IC may be more suitable for implementation of the signal connections of a crossbar circuit. In contrast, the upper metal layers may be more suitable for implementing the longer, straight signal lines of the bus connections between crossbar units and/or the various agents (e.g., processor cores) of the IC. The signal lines of the upper metal layers may have a greater current carrying capacity than those on the lower metal layers. Thus, the signal lines on the upper may have lower resistance than the signal lines on the lower metal layers. The speed at which a signal may travel through any signal line may be a product of its resistance and a capacitance value that depends largely on adjacent signal lines. This value may be referred to as RC delay. Assuming there is only a small variation in capacitance between signal lines on the upper metal layers and those on the lower metal layers, the resistance of a particular signal line may have a significant affect on signal speed. Accordingly, the signal lines on the lower, thin metal layers which have a higher resistances, may have a greater RC delay. Conversely, signal lines on the upper, thicker metal layers which have relatively low resistance, may have a lower RC delay. Therefore, signals may propagate faster on the upper metal layers than on the lower metal layers.

Although the propagation speed of signals conveyed on signal lines of the lower metal layers be subject to a higher RC delay, this penalty may be minimized by the fact that the distances traveled within a crossbar are relatively short. For example, one embodiment of a crossbar circuit is contemplated wherein the circuit is approximately 20 microns at its longest dimension. Thus, signals may propagate through such a crossbar circuit for a much shorter distance relative to the distance of the long distance signal lines implemented on the upper metal layers.

Furthermore, as noted above, the thin wires implemented on the lower metal layers may be more suitable for implementing a crossbar circuit due to the congestion that is typical for such circuits. More particularly, the low thickness of the signal lines on the lower metal layers may enable a higher wiring density. If a sufficient number of thin metal layers are provided, the various route dodges, bends, and branches may be implemented within a relatively small area. Thus, signal propagation times are minimized even at higher RC delays relative to signal lines on the upper metal layers.

Implementing the longer signal lines of the bus on the upper metal layers may take advantage of the greater signal propagation speed that is a benefit of the smaller RC delay. Since the signal lines implemented on the upper metal layers is a straight line extending along either the x- or y-axis in the embodiment of FIGS. 1 and 2, congestion is not an issue.

In general, thicker metal layers suitable for thicker signal lines and thus faster signal propagation times may be used to implement the longer distance connections of the on-die network disclosed herein. Thinner metal layers wherein the signal lines are inherently thin may be used to implement shorter distance connections in which slower propagation speeds can be tolerated. In addition, the thinner metal layers may be more suitable for connecting the various devices in a crossbar circuit since wire congestion is more manageable with thinner signal lines.

Figure 4:
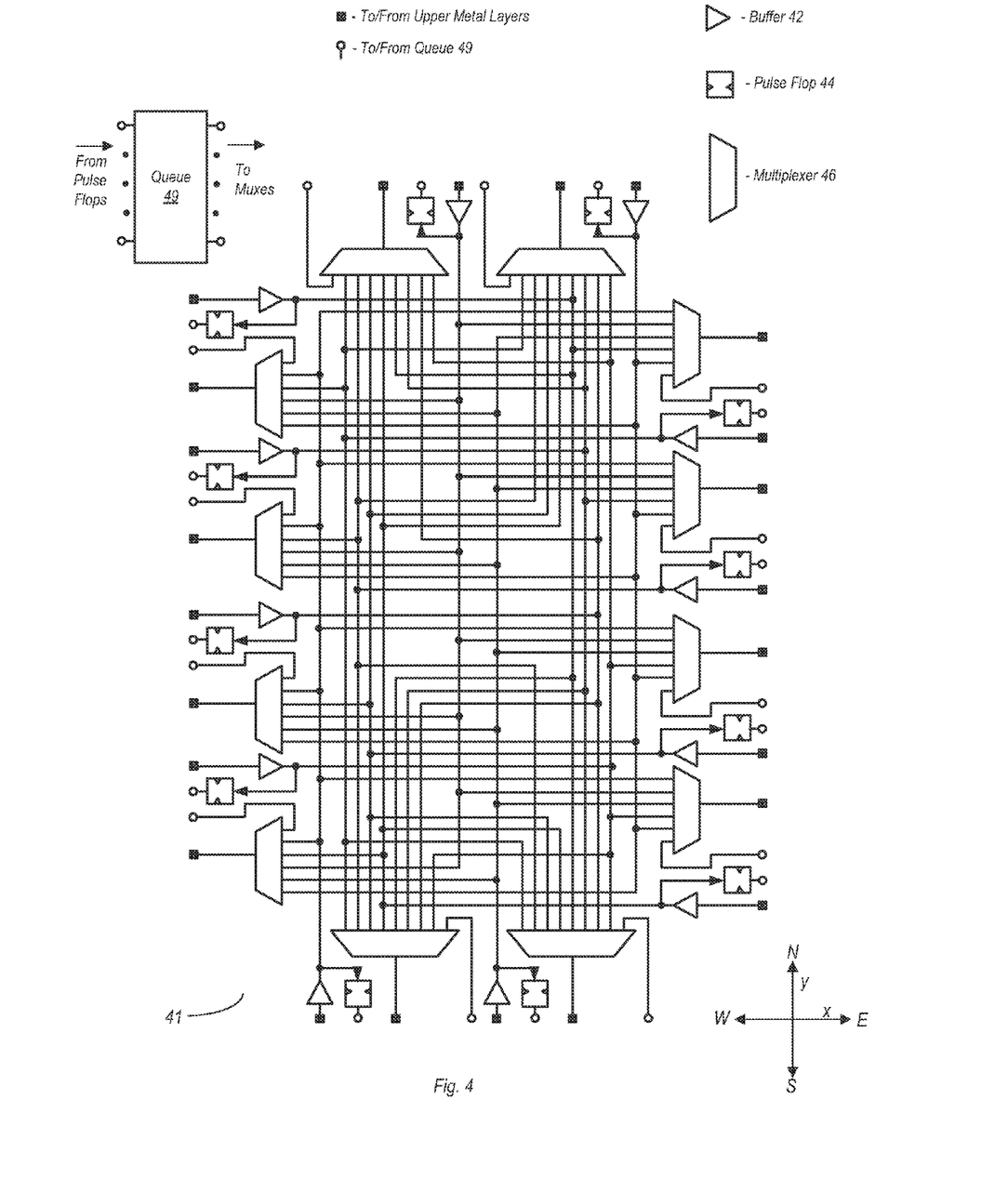
FIG. 4 is a schematic diagram illustrating one embodiment of crossbar circuit including a queue for temporary storage of traffic.
Figure 5:
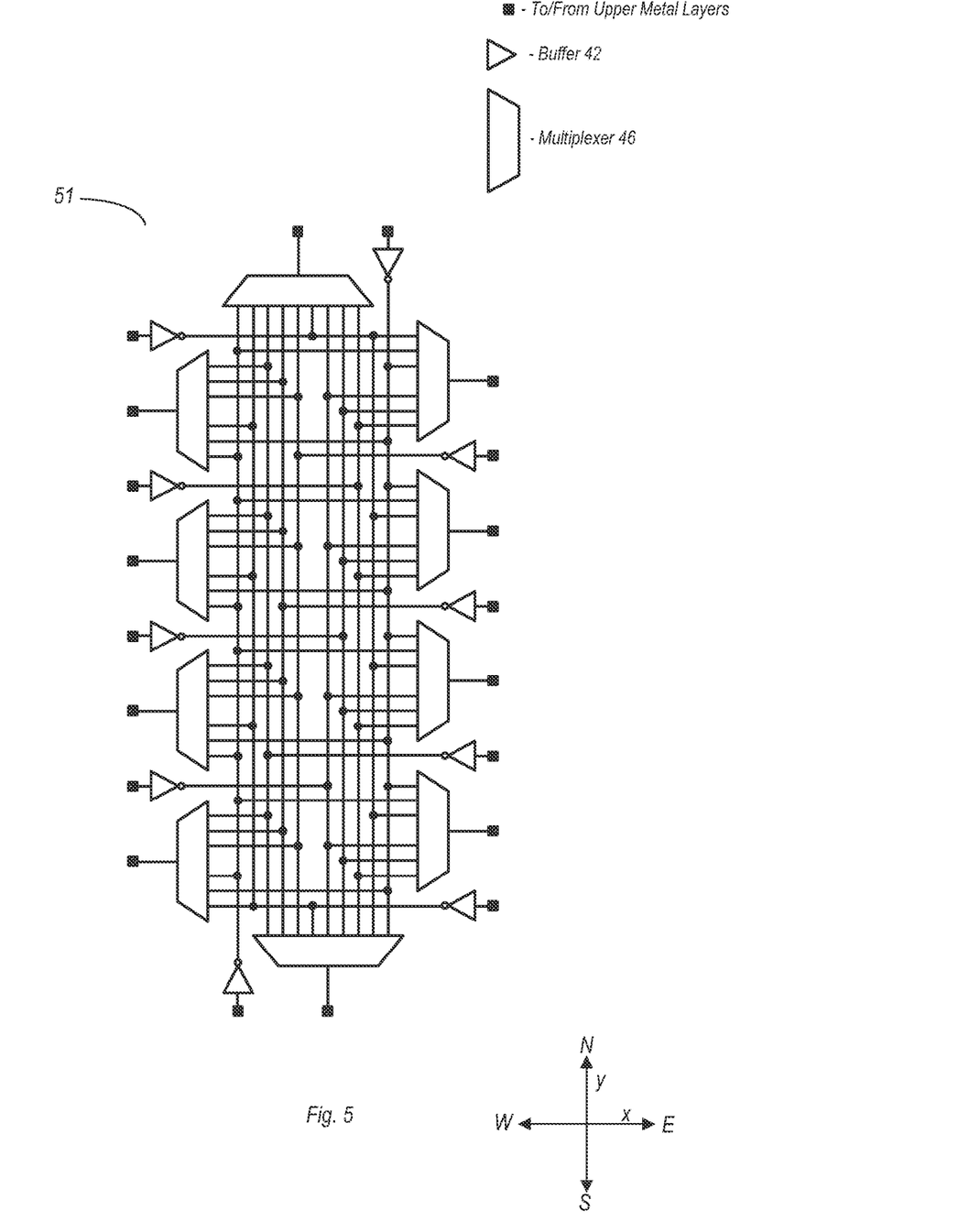
FIG. 5 is a schematic diagram of another embodiment of a crossbar circuit.

Crossbar Circuit Examples:

FIGS. 4 and 5 illustrate two possible crossbar circuit embodiments. FIG. 4 is directed to an embodiment of a 12×12 crossbar circuit having a queue 49. The embodiment shown in FIG. 4 may be repeated N times (e.g., N=128) in an embodiment of crossbar unit 40 of FIG. 1. FIG. 5 is directed to an embodiment of a 10×10 crossbar circuit with no queue, and may be repeated N times in an embodiment of crossbar unit 50 of FIG. 1.

In the embodiment shown in FIG. 4, crossbar circuit 41 is coupled to receive inputs from one signal line of each of four eastbound buses, four westbound buses, two northbound buses, and two southbound buses. Similarly, crossbar circuit 41 is coupled to provide outputs to one signal line of each of four eastbound buses, four westbound buses, two northbound buses, and two southbound buses.

Each signal input into crossbar circuit 41 may be conveyed to a buffer 42 from an upper metal layer through a via. The output of each buffer 42 in this embodiment is coupled to a corresponding input of a number of different instances of a multiplexer 46, and is also coupled to a corresponding pulse flop 44. Each multiplexer 46 may select one of its inputs to be transparent to its output in order to couple signal lines of two different buses together. Accordingly, signals may be received into crossbar circuit 41 through buffers 42 in this embodiment. Signals may be conveyed from crossbar circuit 41 in this embodiment through multiplexers 46.

It is noted that each of multiplexers 46 in the embodiment shown is configured to receive selection signals in one form or another in order to couple a selected input to its output. However, the connection of selection signals to multiplexers are not shown for the sake of simplicity.

In some cases, to avoid collisions, some bus traffic may temporarily be stored in a queue, such as queue 49 in the illustrated example. Accordingly, crossbar circuit 41 may be configured to convey received bits to queue 49, via an associated buffer 42 and pulse flop 44 if necessary to avoid a collision or for other traffic control reasons. Queue 49 also includes a number of outputs each coupled to a corresponding input of a multiplexer 46. In this embodiment, queue 49 may store a bit for each incoming bus (i.e. those buses that provide an input to crossbar circuit 41). Each queue 49 may also be repeated N times, thus forming a larger queue that can store each bit of a transaction conveyed on a given bus coupled to a corresponding crossbar unit.

Queue 49 may be implemented in various ways. In one embodiment, queue 49 may be implemented as a FIFO (first in, first out memory), with the first bits stored therein being the first bits to be read out and conveyed to a multiplexer for transmission. In another embodiment, queue 49 may be implemented as another type of memory, with an arbitration scheme employed to determine when stored information is read therefrom.

Crossbar circuit 51 of FIG. 5 is arranged similarly to crossbar circuit 41 of FIG. 4. However, crossbar circuit 41 in the embodiment shown does not include a queue. Furthermore, the arrangement of crossbar circuit 51 may implement certain design rules. More particularly, crossbar circuit 51 is arranged such that incoming traffic may either exit either in the same direction (e.g., incoming westbound traffic exits as westbound traffic) or through making a 90° turn (e.g., incoming eastbound traffic exits as northbound traffic). However, crossbar circuit 51 in the embodiment shown is arranged such incoming traffic is not allowed to make a 180° turn. For example, crossbar circuit 51 is arranged such that incoming eastbound traffic does not exit as outgoing westbound traffic. Thus, crossbar circuit 51 in this particular embodiment is configured such that traffic passing through continues in the same direction or makes a 90° turn, but does not exit propagating in the opposite direction from which it entered.

Crossbar circuit 41 may operate in a similar manner as crossbar circuit 51 with respect to traffic flow. However, embodiments are also possible and contemplated where traffic that is temporarily stored in queue 49 is propagated from crossbar circuit 41 in the direction opposite that from which it entered. It is also noted that for both crossbar circuit 41 and crossbar circuit 51, alternate embodiments are possible and contemplated where additional connections are provided to allow bus traffic to exit the circuit in a direction opposite that which it entered. In various embodiments, crossbar circuits 41 and 51 may be arranged to inhibit the coupling of two buses arranged to convey signals in opposite directions, thereby preventing traffic from changing direction by 180° within a single crossbar circuit. However, crossbar circuit embodiments that permit a 180° change of direction of bus traffic within a single crossbar circuit are possible and contemplated.

Figure 6:
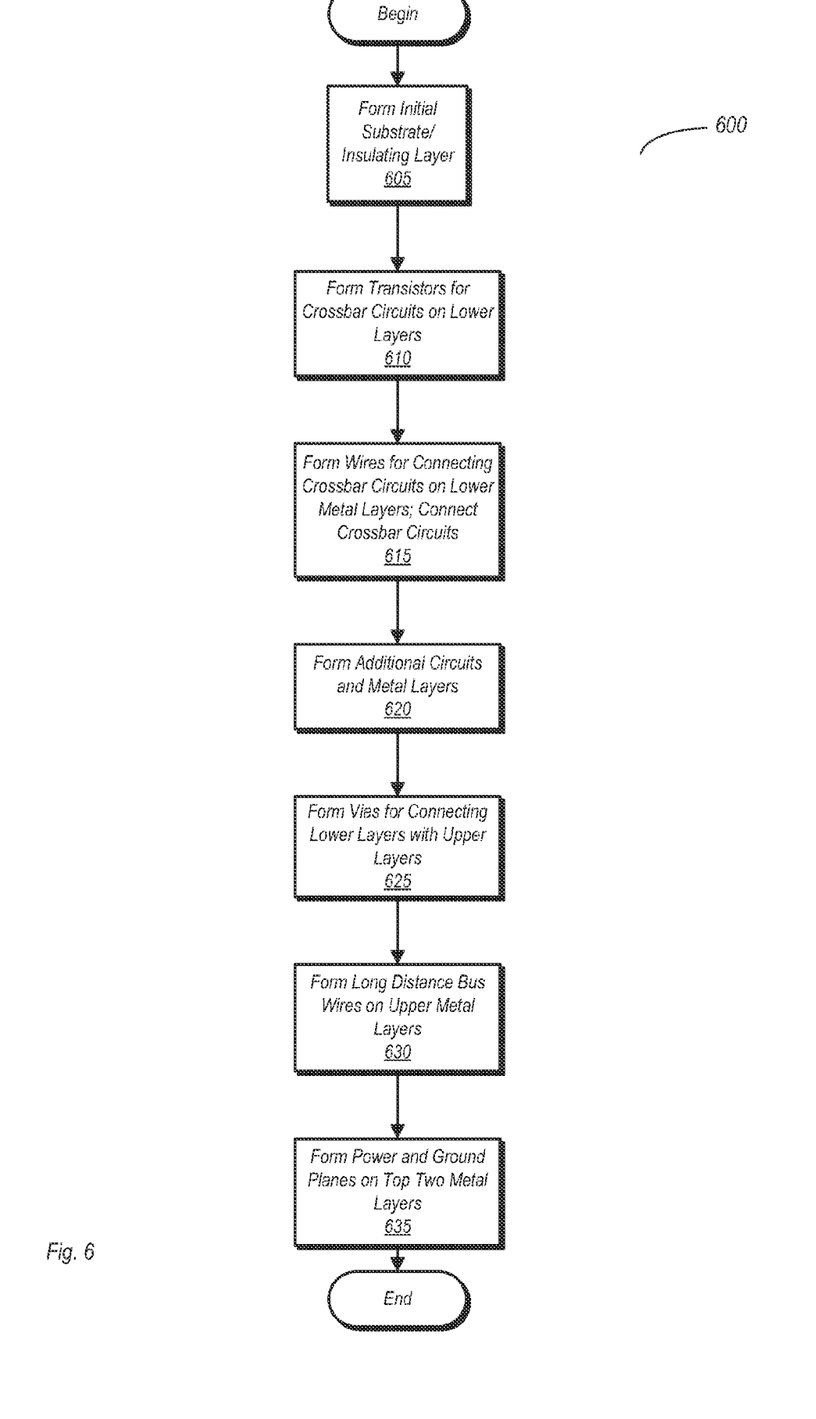
FIG. 6 is a flow diagram of one embodiment of a method for fabricating an IC.

IC Fabrication Method:

FIG. 6 is a flow diagram of one embodiment of fabricating an IC having an on-die network as described above. It is noted that the method described herein is not intended to be a comprehensive explanation of every step necessary to fabricate an IC. Rather, the illustrated method is directed to steps included in manufacturing an IC that includes an on-die network as previously described. It is also noted that while the method steps are illustrated as being performed in a particular order, the actual order may vary, and the performance of some of these steps may be interleaved with the performance of others.

In the embodiment shown, method 600 begins with the forming of an initial substrate layer (block 605). The initial layer may be formed of an insulating material. Transistors may be for the crossbar circuits may be formed on various ones of the lower silicon layers (block 610). The transistors may be formed in accordance with standard CMOS (complementary metal oxide semiconductor) processes or other manufacturing processes suitable for forming transistors. On the lower metal layers, wiring may be formed to form the interconnections of the crossbar circuits (block 615). In one embodiment, wiring connections may be formed on lower metal layers in accordance with the embodiment shown in FIG. 3, wherein some metal layers are used to form wires along the x-axis, while other metal layers are used to form wires along the y-axis.

Additional devices and circuits, along with corresponding interconnections, may be formed on layers above the lower layers in which the crossbar circuits are formed (block 620). Vias may also be formed along with the devices and interconnections of various layers (block 625). The formation of the vias may occur concurrently with the formation of the other layers of metal, silicon, and other materials that may be used.

Long distance bus wires may be formed in among the upper metal layers of the IC (block 630). In one embodiment, the long distance wires may be formed and arranged according to the principles discussed above in reference to FIGS. 2 and 3. The long distance wires may be connected between vias that are also coupled to particular ones of the crossbar circuits. Thus, the formation of the bus wires on the upper metal layers may include connecting the crossbar circuits of different crossbar units to one another.

The final two metal layers formed in this embodiment are the power and ground planes (block 635). These may be the thickest metal layers of the IC. Vias may also be formed to connect the power and ground planes to the various circuits of the IC.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit comprising:
    a first bus configured to convey signals in a first direction along a first axis;
    a second bus configured to convey signals in a second direction along the first axis, wherein the second direction is opposite the first direction, wherein signal lines of equal bit significance of the first bus and the second bus are arranged adjacent to each other;
    a third bus configured to convey signals in a third direction along a second axis, wherein the second axis is perpendicular to the first axis;
    a fourth bus configured convey signals in a fourth direction along the second axis, wherein the fourth direction is opposite of the third direction, wherein signal lines of equal bit significance of the third bus and the fourth bus are arranged adjacent to each other, wherein each of the first, second, third and fourth buses are N bits wide, and wherein each of the first, second, third, and fourth buses are unidirectional buses; and
    a crossbar unit having N crossbar switching circuits, wherein each of the N crossbar switching circuits is configured to couple a selected signal line of one of the buses to a corresponding selected signal line of another one of the buses.

2. The integrated circuit as recited in claim 1, wherein each of the first, second, third, and fourth buses are formed on a first subset of a plurality of metal layers of the integrated circuit, and wherein the N crossbar switching circuits are formed on a second subset of the plurality of metal layers, wherein each metal layer of the first subset is thicker than any layer of the second subset.

3. The integrated circuit as recited in claim 1, wherein the integrated circuit includes a plurality of agents, and wherein each of the first, second, third and fourth buses is coupled to at least one of the plurality of agents, and wherein the plurality of agents includes each of the following:
    at least one processor core;
    at least one memory controller; and
    at least one input/output (I/O) unit.

4. The integrated circuit as recited in claim 1, wherein each of the first, second, third, and fourth buses is a data bus configured to convey M bits of data, wherein M is an integer value less than or equal to N.

5. The integrated circuit as recited in claim 1, further comprising a plurality of queues, wherein each of the plurality of queues is associated with a corresponding one of the plurality of crossbar switching circuits, wherein each of the plurality of queues is configured to provide temporary storage of data to be passed through its corresponding one of the plurality of crossbar switching circuits.

6. The integrated circuit as recited in claim 2, further comprising:
    a first plurality of buses, including the first bus, configured to convey signals in the first direction along the first axis;
    a second plurality of buses, including the second bus, configured to convey signals in the second direction along the first axis;
    a third plurality of buses, including the third bus, configured to convey signals in the third direction along the second axis;
    a fourth plurality of buses, including the fourth bus, configured to convey signals in the fourth direction along the second axis; and
    a plurality of crossbar units each configured to couple a selected one of the first, second, third and fourth plurality of buses to another selected one of the first, second, third and fourth plurality of buses, wherein each of the plurality of crossbar units includes N crossbar switching circuits.

7. The integrated circuit as recited in claim 4, wherein N is less than M, and wherein the first, second, third, and fourth buses are configured to convey N-M bits of one or more of the following types:
    error correcting code (ECC) bits;
    control bits.

8. The integrated circuit as recited in claim 6, wherein each signal line of a given one of the first plurality of buses is adjacent to a signal line of equal bit significance of the second plurality of buses, and wherein each signal line of a given one of the third plurality of buses is adjacent to a signal line of equal bit significance of the fourth plurality of buses.

9. The integrated circuit as recited in claim 6, wherein signal lines for each of the first, second, third and fourth pluralities of buses are formed on the first subset of a plurality of metal layers, and wherein the N crossbar circuits of each of the plurality of crossbar units is formed on the second plurality of metal layers.

10. The integrated circuit as recited in claim 6, wherein the each of the plurality of crossbar units is configured to couple two or more buses configured to convey signals in a same direction, and further configured to couple two buses that are aligned along perpendicular axes, and wherein each of the plurality of crossbar units is configured to inhibit the coupling of two buses configured to convey signals in opposite directions.

11. An integrated circuit comprising:
a first plurality of buses aligned along a first axis, wherein the first plurality of buses includes a first bus configured to convey signals in a first direction along the first axis and a second bus configured to convey signals in a second direction along the first axis, the second direction being opposite the first direction;
a second plurality of buses aligned along a second axis perpendicular to the first axis, wherein the second plurality of buses includes a third bus configured to convey signals in a third direction along the second axis, and a fourth bus configured to convey signals in fourth direction along the second axis, the fourth direction being opposite the third direction;
wherein each of the first and second pluralities of buses is configured to convey N bits, wherein each of the first and second pluralities of buses is formed on one or more of a first subset of a plurality of metal layers, and wherein each of the first and second pluralities of buses is a unidirectional bus;
a plurality of crossbar units, wherein each of the plurality of crossbar units includes N single-bit crossbar circuits configured to couple bits of equal significance of one of the first and second pluralities of buses to another one of the first and second pluralities of buses, and wherein each of the N single-bit crossbar circuits is implemented on one or more of a second subset of the plurality of metal layers, wherein each metal layer of the first subset has a thickness greater than any metal layer of the second subset.

12. The integrated circuit as recited in claim 11, wherein signal lines of each of the plurality of buses are adjacent to at least one signal line having an equivalent bit significance of another one of the plurality of buses.

13. The integrated circuit as recited in claim 11, wherein each of the crossbar units is configured to couple two or more of the first and second pluralities of buses configured to convey signals in a same direction, and further configured to couple a selected one of the first plurality of buses to a selected one of the second plurality of buses, and wherein each of the plurality of crossbar units is configured to inhibit coupling together two of the first plurality of buses or two of the second plurality of buses that are configured to convey signals in opposite directions.

14. The integrated circuit as recited in claim 11, wherein each of the buses is configured to convey M bits of data, wherein M is an integer value less than or equal to N.

15. The integrated circuit as recited in claim 12, wherein signal lines of each of the plurality of buses are adjacent to at least one signal line of another one of the plurality of buses that is configured to convey signals in an opposite direction.

16. The integrated circuit as recited in claim 15, wherein the integrated circuit includes a plurality of functional units, wherein a first one of the plurality of functional units is coupled to two of the first plurality of buses, wherein the two of the first plurality of buses are configured to convey signals in opposite directions with respect to each other, and wherein a second one of the plurality of functional units is coupled to two of the second plurality of buses, wherein the two of the second plurality of buses are configured to convey signals in opposite directions with respect to each other.

17. The integrated circuit as recited in claim 16, wherein the plurality of functional units includes at least one each of the following:
a processor core;
a memory controller;
an input/output unit.

18. The integrated circuit as recited in claim 16, further comprising a queue, wherein the queue is associated with a corresponding one of the plurality of crossbar units, and wherein the queue is configured to store data in transit between a first one of the plurality of functional units and a second one of the plurality of functional units.

19. A method comprising:
forming first and second buses along a first axis of an integrated circuit (IC), wherein the first and second buses are formed as unidirectional buses, and wherein said forming first and second buses includes:
arranging the first bus to convey signals in a first direction;
arranging the second bus to convey signals in a second direction opposite of the first direction; and
arranging signal lines of equal bit significance of the first and second buses to be adjacent to one another;
forming third and fourth buses along a second axis of the IC, the second axis being perpendicular to the first axis, wherein the third and fourth buses are formed as unidirectional buses, and wherein said forming third and fourth buses includes:
arranging the third bus to convey signals in a third direction;
arranging the second bus to convey signals in a fourth direction opposite of the third direction; and
arranging signal lines of equal bit significance of the third and fourth buses to be adjacent to one another; and
forming a crossbar unit having a plurality of crossbars switching circuits configured to couple a selected signal line of one of the buses to a corresponding selected signal line of another one of the buses;
wherein said first, second, third, and fourth buses are formed in a first subset of a plurality of metal layers of the IC, wherein the crossbar switching circuits are formed in a second subset of a plurality of metal layers, and wherein each metal layer of the first subset has a thickness greater than any metal layer of the second subset.

20. The method as recited in claim 19, wherein at least one of the second subset of metal layers is a bottom metal layer of the integrated circuit.

* * * * *